US007327332B2

(12) United States Patent
Otawara

(10) Patent No.: US 7,327,332 B2
(45) Date of Patent: Feb. 5, 2008

(54) PLASMA DISPLAY PANEL VIDEO PROCESSING CIRCUIT AND METHOD AND VIDEO DISPLAY DEVICE AND METHOD USING PLASMA DISPLAY PANEL

(75) Inventor: Masayuki Otawara, Yokohama (JP)

(73) Assignee: Samsung SDI Co., Ltd., Suwon-si (KR)

( * ) Notice: Subject to any disclaimer, the term of this patent is extended or adjusted under 35 U.S.C. 154(b) by 658 days.

(21) Appl. No.: 10/901,924

(22) Filed: Jul. 28, 2004

(65) Prior Publication Data

US 2005/0052355 A1 Mar. 10, 2005

(30) Foreign Application Priority Data

Jul. 30, 2003 (JP) ............................ 2003-282670

(51) Int. Cl.
*G09G 3/28* (2006.01)
*H04N 5/14* (2006.01)
*H04N 9/64* (2006.01)

(52) U.S. Cl. .......................... 345/63; 345/60; 345/204; 345/63; 348/699; 348/700; 348/701; 348/714; 348/715; 348/716

(58) Field of Classification Search ................. 345/60, 345/63, 204; 348/699, 700, 701, 714, 715, 348/716
See application file for complete search history.

(56) References Cited

U.S. PATENT DOCUMENTS 6,061,100 A * 5/2000 Ward et al. ................. 348/607
6,717,558 B1 * 4/2004 Weitbruch et al. ............ 345/63
7,071,902 B1 * 7/2006 Kawahara .................... 345/63
7,102,599 B2 * 9/2006 Okuzawa et al. ............. 345/63

FOREIGN PATENT DOCUMENTS

EP 1426915 A1 * 6/2004
JP 11-85102 3/1999
JP 2004-4782 1/2004

OTHER PUBLICATIONS

Isao et al., Reduction of Motion Picture Disturbance for High Resolution PDP, ITE 2000:2000 Annual Convention, pp. 369-370 and Partial Translation 1 pg.
Patent Abstracts of Japan, Publication No. 11-085102, dated Mar. 30, 1999, in the name of Isato Denda et al.
Patent Abstracts of Japan; Publication No. 2004-004782, Jan. 8, 2004, in the name of Isao Kawahara et al.

* cited by examiner

*Primary Examiner*—Richard Hjerpe
*Assistant Examiner*—My-Chau T. Tran
(74) *Attorney, Agent, or Firm*—Christie, Parker & Hale, LLP

(57) ABSTRACT

A video processing circuit for preventing generation of contour noise irrespective of varied directions of light emission schemes. A first video signal and a second video signal delayed by a predetermined field are received, a first motion detection result is output when a signal level of the first video signal is greater than that of the second video signal, and a second motion detection result is output if the second video signal is greater than the first video signal. A flag is established according to the first motion detection result, and a third video signal generated by delaying the first video signal is output. The lighted pattern of the third video signal is switched according to the second motion detection result and the flag.

24 Claims, 7 Drawing Sheets

| Display gray scales | SF1 (1) | SF2 (1) | SF3 (1) | SF4 (1) | SF5 (1) | SF6 (1) | SF7 (1) | SF8 (1) |
|---|---|---|---|---|---|---|---|---|
| 0 | | | | | | | | |
| 1 | O | | | | | | | |
| 2 | | O | | | | | | |
| 3 | O | O | | | | | | |
| 4 | | | O | | | | | |
| 5 | O | | O | | | | | |
| 6 | | O | O | | | | | |
| 7 | O | O | O | | | | | |
| 8 | | | | O | | | | |
| ~ | | | | | | | | |
| 127 | O | O | O | O | O | O | O | |
| 128 | | | | | | | | O |
| ~ | | | | | | | | |
| 254 | | O | O | O | O | O | O | O |
| 255 | O | O | O | O | O | O | O | O |

| | ① | ② |
|---|---|---|
| Gray scales of previous subfield | 7 | 8 |
| Gray scales of current subfield | 7.15 | 7 |

Cause of generation of contour noise

PLASMA DISPLAY PANEL VIDEO PROCESSING CIRCUIT AND METHOD AND VIDEO DISPLAY DEVICE AND METHOD USING PLASMA DISPLAY PANEL

CROSS REFERENCE TO RELATED APPLICATION

This application claims priority to and the benefit of Japanese Patent Application No. 2003-282670 filed on Jul. 30, 2003 in the Japanese Intellectual Property Office, the entire content of which is incorporated herein by reference.

BACKGROUND OF THE INVENTION (a) Field of the Invention

The present invention relates to a plasma display panel (PDP) video processing circuit, a video display device using the video processing circuit, a video processing method, and a video display method using the video processing method.

(b) Description of the Related Art

Image qualities of PDPs such as brightness and contrast have been improved, and they have come to be used for large-screen flat displays.

AC PDPs use a subfield method for controlling lighting of pixels in order to represent gray scales. FIG. 5 shows a subfield sequence for displaying 256 gray scales with eight subfields. As shown, each subfield has an address period and a sustain period. All of the subfields have the same address period but different sustain periods. Numbers provided below the respective subfields are weights of the corresponding subfields The number of sustain pulses assigned to the subfields is increased by the ratio of weights, and the sustain periods are lengthened according to the increase in the number of sustain pulses. PDPs typically display gray scales by combining the lighting and non-lighting of the respective subfields.

FIG. 6 shows combinations of gray scales that are actually displayed when representing the 256 gray scales and the lighted subfields. The subfields indicated with a "?" are the lighted subfields.

An address period is inserted between the sustain periods of each subfield. This discontinuous lighting appears as if the lighting of each subfield is integrated and continuous because of an "afterimage effect" to human eyes. When the total amount of lighting is varied because subfields are combined with different weights, it is deemed to be a variation of brightness, which represents the gray scales.

However, this gray scale representation method causes a "contour noise" phenomenon, which occurs when displaying video with the subfield method. Contour noise occurs where a lighting scheme is greatly varied. In this instance, the lighting scheme represents a combination of different subfields.

A conventional method for detecting motion between frames and applying the gray scales with consecutive lighting schemes to the detected motion has been proposed in order to solve the contour noise problem by Kawahara Isao and Sekimoto Kunio, "Developments of suppressing dynamic false contour for fine PDP" in the annual image information media transactions, pp. 369-370, published in 2000. This method is effective in that the contour noise is reduced while maintaining the current display performance.

FIG. 7 shows an example of a screen on which the gray scales are represented by using a subfield sequence. As shown, a square window of the 128/255 gray scale is displayed on the background of the gray scale of 127/255.

When the images on the screen are still, normal gray is represented by the combination of the subfields with different weights.

FIG. 8 shows the window of the gray scale of 128/255 of FIG. 7 scrolled to the right on the screen. A dark portion and a bright portion which are not shown when the window is not moved, appear at the front and the end of the window.

The dark portion and the bright portion are referred to as the contour noise. The unintended bright portion and the dark portion are displayed with a gray difference of 1 with gradually consecutive variation of the gray scales in the image. As such, this phenomenon substantially damages the quality of the video display.

Widths of the bright portion and the dark portion vary according to the speed of which the window moves, and the widths are generally widened as the window moves faster.

FIG. 9 illustrates how contour noise is generated. The subfield numbers SF1 to SF8 represent lighted subfields and correspond to the subfield number of FIGS. 5 and 6. The whole one-field period is not occupied by the sustain period in a precise temporal manner, that is, a light emission time since the address period is actually provided, but for ease of description, the one-field period is illustrated in FIG. 9 to be occupied by the light emission time.

Human eyes follow the front portion (depicted by an arrow) of the moving window with the gray scale of 128/255, but a person who looks at the front portion initially sees the lighting of gray scale of 127 on the background because of the afterimage effect, and then sees the lighting of the window with the gray scale of 128, as shown in FIG. 9.

As can be seen from FIG. 9, the combination of the lighted subfields is substantially modified in the case of the gray scales of 127 and 128, and hence, the time without light emission is increased at the variation point of the gray scale from 127 to 128 as shown in FIG. 9. Accordingly, the brightness of the front portion is reduced, and the dark portion shown in FIG. 8 appears.

An opposite phenomenon occurs at the rear portion of the window, and the bright portion of FIG. 8 appears since the light emission of the gray scales of 127 and 128 approach.

Generation frequencies of the contour noise are somewhat predictable. The generation of contour noise increases at the boundary of the gray scales with greatly varied light emission schemes, such as between the gray scales 7 and 8, and between the gray scales 15 and 16 from the subfield arrangement tables shown in FIGS. 6 and 10.

Accordingly, it is possible to effectively reduce the contour noise near the gray scales at which the contour noise is generated by detecting and processing the motion of the gray scales.

As shown in FIG. 11, a method for reducing the contour noise is to display the moving pixels by only using the gray scales which have continuous light emission schemes and have no unlighted subfields between the gray scales. This method is effective for reducing the contour noise because it uses lesser variations of the light emission schemes.

The case of displaying the gray scale of 256 from the 8 subfields is partially illustrated in FIG. 11. The gray scales with the consecutive light emission schemes include nine gray scales of 0, 1, 3, 7, 15, 31, 63, 127, and 255. Accordingly, a multiple gray scale processing method such as error diffusion is used in order to represent 256 gray scales. However, this method generates rough gray scale representations when the gray scales are displayed using only restricted gray scales for all the pixels in the multiple gray scale processing method.

Therefore, a field memory is used as shown in FIG. 12 to compare the current-field signal with the immediately previous field signal to determine whether motion is indicated by the difference of their magnitude. When no motion is indicated, the input video signals are output as they are. When motion is indicated, the signals which are processed by using the consecutive gray scales are output.

This conventional contour noise reduction method adds some efficiency to the image display, but it may generate an opposite effect, which will now be described.

FIG. 10 shows combined contents of gray scales and lighted subfields of FIG. 6 with reference to the actual light emission time. FIGS. 13(*a*), 13(*b*), and 13(*c*) show the combination of the gray scales 7 and 8 in the window of FIGS. 7 and 8. FIG. 13(*a*) shows a previous field, FIG. 13(*b*) shows a current field, dotted lines provided over FIGS. 13(*a*) to 13(*c*) show a shift of the window between two fields, and slanted areas indicated as A and B in FIG. 13(*c*) show areas which are determined to have motion according to motion detection results.

The results determined to "have motion" are reflected on the current field, and gray scales with consecutive light emission schemes are applied to the background's corresponding positions near the right and left portions in the window of FIG. 13(*b*) corresponding to the areas A and B.

FIG. 14 shows gray scales of previous fields of the positions of the areas A and B of FIG. 13(*c*) and the gray scales applied to the current field. As to the area A, the gray scale 8 is represented by using the gray scales 7 and 15 and performing an error diffusion process in order to represent the gray scale 8 with only gray scales having consecutive schemes. As to the area B, the gray scale 7 is represented as it is since the gray scale 7 has consecutive schemes.

The combinations of the gray scale of the previous fields and the gray scale of the current fields of the area A are compared referring to FIG. 10. Since the gray scale 7 of the previous field corresponds to the gray scales 7 and 15 in the current field, all the light emission schemes in FIG. 10 are consecutive, and hence, the light emission schemes are less scattered and the contour noise is reduced compared to the gray scale 8 of the original current field.

However, regarding the area B, the contour noise is not reduced since the previous field has the gray scale 8 having a light emission scheme with a gap even if the current field is represented with gray scales having consecutive light emission schemes. Because the previous field has already been displayed, it cannot be processed like area A to have gray scales with consecutive schemes.

SUMMARY

The present invention provides a video processing circuit, a video display device using the video processing circuit, a video processing method, and a video display method using the video processing method for preventing generation of contour noise irrespective of varied directions of light emission schemes.

In one aspect of the present invention, a PDP video processing circuit includes a comparison circuit for receiving a first video signal and a second video signal which is delayed by a predetermined field, outputting a first motion detection result when a signal level of the first video signal is greater than a signal level of the second video signal, and outputting a second motion detection result when the signal level of the first video signal is less than the signal level of the second video signal. A first switching circuit is provided for receiving the first video signal, switching a lighted pattern according to the first motion detection result output by the comparison circuit, establishing a predetermined flag signal, and outputting a third video signal, which is delayed by a predetermined field. A second switching circuit is also provided for receiving the third video signal output by the first switching circuit, and switching a lighted pattern according to a second motion detection result output by the comparison circuit and the flag signal of the third video signal.

The comparison circuit of this embodiment compares the signal level of the first video signal with the signal level of the second video signal as a near value at which contour noise may be generated.

The first switching circuit converts the first video signal into a gray scale with consecutive light emission schemes to thus generate the converted video signal into multiple gray scales, establishes the flag signal, and outputs the third video signal delayed by the predetermined field, when the first motion detection result indicates existence of motion.

In one embodiment, the first switching circuit performs gray scale conversion and multiple gray scale processing on the pixel which indicates that the first motion detection result indicates motion.

The first switching circuit outputs the third video signal, which is generated by delaying the first video signal by a predetermined field, without establishing the flag signal when the first motion detection result indicates no existence of motion.

The second switching circuit outputs the third video signal without switching the lighted pattern when the second motion detection result indicates the existence or nonexistence of motion and the flag signal is established.

The second switching circuit switches the lighted pattern and outputs the third video signal when the second motion detection result indicates existence of motion and the flag signal is not established.

The second switching circuit outputs the third video signal without switching the lighted pattern when the second motion detection result indicates no existence of motion and the flag signal is not established.

The second switching circuit outputs the third video signal except the flag signal after switching the lighted pattern.

In still another aspect of the present invention, a PDP video processing method includes receiving a first video signal and a second video signal which is delayed by a predetermined field, outputting a first motion detection result when a signal level of the first video signal is greater than a signal level of the second video signal, and outputting a second motion detection result when the signal level of the first video signal is less than the signal level of the second video signal. This embodiment of the method further includes receiving the first video signal, switching a lighted pattern according to the first motion detection result, establishing a predetermined flag signal, and outputting a third video signal which is delayed by a predetermined field; and receiving the third video signal, and switching a lighted pattern according to the second motion detection result and the flag signal.

The signal level of the first video signal is compared with the signal level of the second video signal for a near value at which contour noise may be generated. The first video signal is converted into a gray scale with consecutive light emission schemes to thus generate the converted video signal into multiple gray scales, establishing the flag signal, and outputting the third video signal delayed by the predetermined field, when the first motion detection result indicates existence of motion.

The gray scale conversion and multiple gray scale processing is performed on a pixel that indicates that the first motion detection result has existence of motion.

The third video signal that is generated by delaying the first video signal by a predetermined field is output without establishing the flag signal when the first motion detection result indicates no existence of motion.

The third video signal is output without switching the lighted pattern when the second motion detection result indicates either the existence or nonexistence of motion and the flag signal is established.

The lighted pattern is switched and the third video signal is output when the second motion detection result indicates existence of motion and the flag signal is not established.

The third video signal is output without switching the lighted pattern when the second motion detection result indicates no existence of motion and the flag signal is not established.

The third video signal is output except the flag signal after switching the lighted pattern.

DETAILED DESCRIPTION

To address one or more of the problems discussed above, in one embodiment of the present invention, a memory for two fields is used, a motion is detected, and a case for applying consecutive gray scales to the corresponding pixel of the current field and a case for applying the consecutive gray scales to the corresponding pixel of the previous field are adaptively switched with respect to the motion-detected pixels so that the contour noise is improved irrespective of motion directions.

Figure 1:
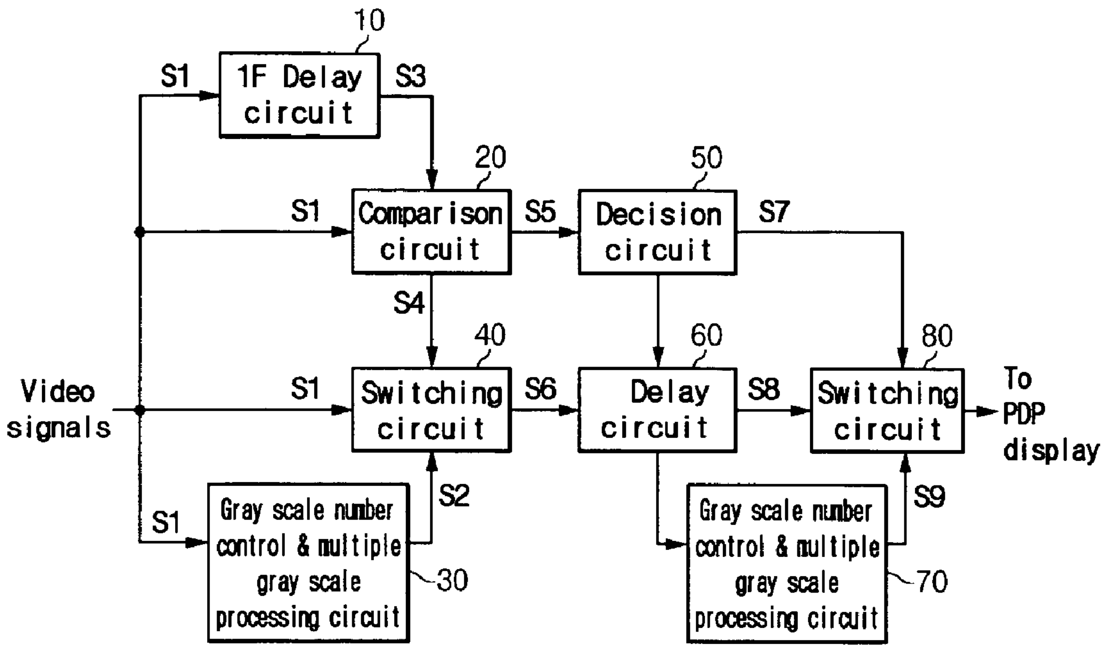
FIG. 1 shows a video processing circuit according to one embodiment of the invention.

A PDP video processing circuit according to the exemplary embodiment of the present invention will be described with reference to a drawing. FIG. 1 shows a video processing circuit 1 according to the exemplary embodiment of the present invention.

The video processing circuit 1 comprises a first delay circuit 10, a comparison circuit 20, a first gray scale number controlling/multiple gray scale processing circuit 30, a first switching circuit 40, a decision circuit 50, a second delay circuit 60, a second gray scale number controlling/multiple gray scale processing circuit 70, and a second switching circuit 80.

The first delay circuit 10 delays a video signal S1 input to the video processing circuit 1 by a predetermined number of fields (exemplified to be one field hereinafter), and outputs a video signal S3 (which is a video signal delayed by one field with reference to the video signal S1) to the comparison circuit 20.

In this embodiment, the video signal input to the first delay circuit 10 includes RGB (red/green/blue) digital data.

The comparison circuit 20 receives the video signals S1 and S3, and compares a signal level of the video signal S1 with a signal level of the video signal S3.

When the signal level of the video signal S1 is greater than the signal level of the video signal S3, the comparison circuit 20 outputs a motion detection result S4 to the first switching circuit 40, and when the signal level of the video signal S1 is less than the signal level of the video signal S3, the comparison circuit 20 outputs a motion detection result S5 to the decision circuit 50. Also, the comparison circuit 20 compares the signal level of the video signal S1 with the signal level of the video signal S3 of the first delay circuit 10 near a value at which contour noise is apt to be generated and which is preset according to a light emission scheme.

In detail, the comparison circuit 20 compares the input signal S1 with the output signal S3 of the first delay circuit 10 near a value at which contour noise is apt to be generated, and respectively outputs motion detection results S4 or S5 for showing the existence or nonexistence of motion when the signal level of the input signal S1 is greater than the signal level of the output signal S3. Thus, the light emission schemes can be varied in directions of both increasing and decreasing signal levels.

Figure 11:
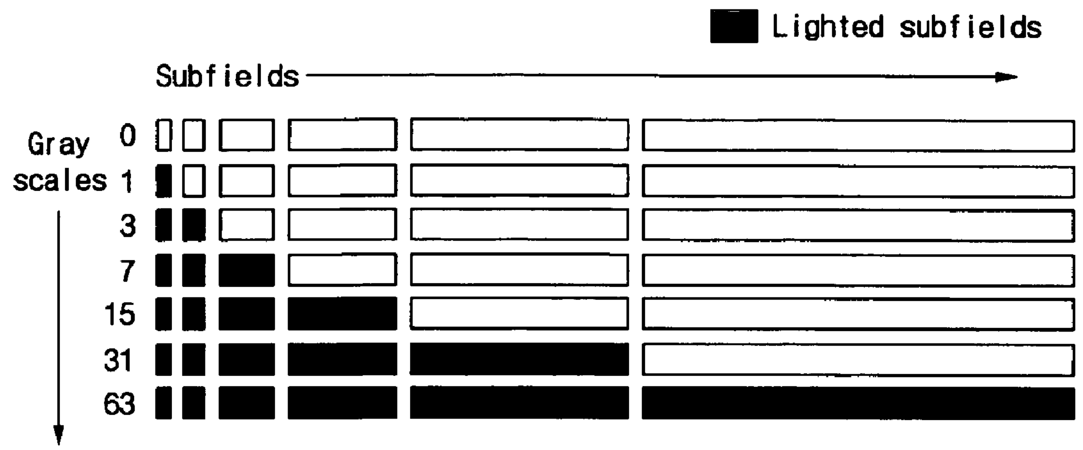
Fig. 11 (Prior Art)
FIG. 11 shows a diagram illustrating prior art lighted patterns of the gray scales with consecutive light emission schemes.
Figure 12:
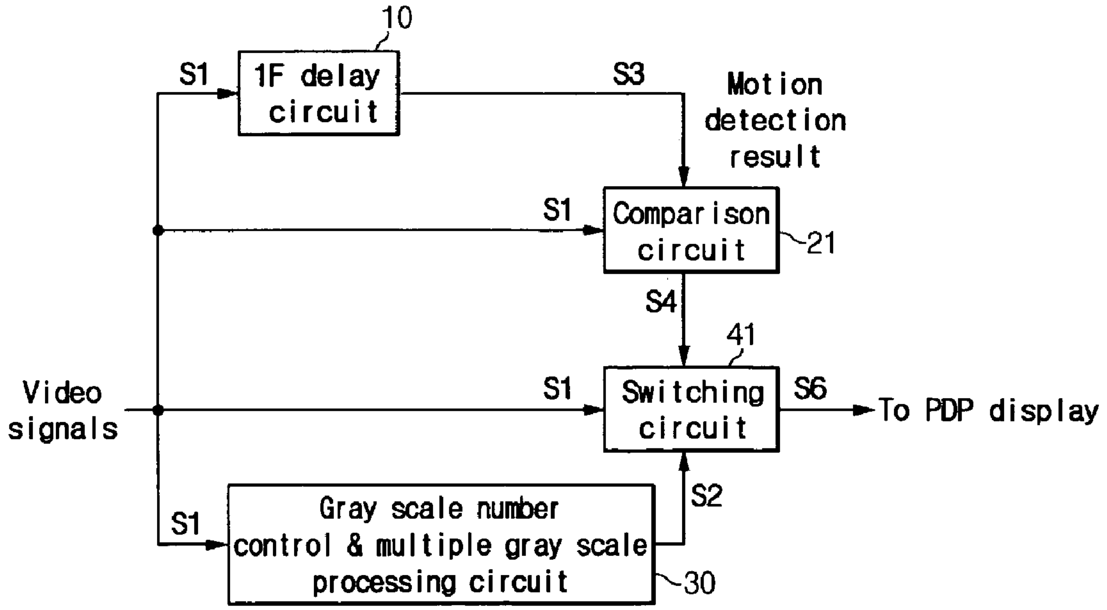
Fig. 12 (Prior Art)
FIG. 12 shows a conventional motion detection circuit for preventing generation of contour noise.

The first gray scale number controlling/multiple gray scale processing circuit 30 represents the video signal S1 by gray scales with discontinuous light emission schemes in a format of gray scales with continuous light emission schemes (such as the gray scale 7 of FIG. 11). The first processing circuit 30 then performs a multiple gray scale process (e.g., an error diffusion process) on the number of original gray scales (the gray scale 256 in the exemplary embodiment), and outputs a video signal S2, which is converted from the video signal S1 and has consecutive light emission schemes, to the first switching circuit 40.

In this instance, the gray scales with consecutive light emission schemes represent gray scales having the consecutive subfield numbers lighted (naught, 1, 1-2, 1-3, 1-4, 1-5, 1-6, 1-7, 1-8) in a like manner of display gray scales 0, 1, 3, 7, 15, 31, 63, 127, and 255, shown in FIG. 11.

The first switching circuit 40 receives the video signal S1, switches a lighted pattern according to the motion detection result S4 output by the comparison circuit 20, establishes a flag F1, outputs a video signal S6 delayed by one field by the second delay circuit 60 to the second gray scale number controlling/multiple gray scale processing circuit 70 and the second switching circuit 80, and outputs the flag F1 to the decision circuit 50.

In this instance, the switching of the lighted pattern is represented by the video signal S1, which is represented by the gray scales with discontinuous light emission schemes and the gray scales with continuous light emission schemes. The switching represents switching the video signal S2 in which the original gray scales are multiple gray scales with consecutive light emission schemes.

In detail, when the first gray scale number controlling/multiple gray scale processing circuit 30 outputs the gray-scale-converted and multi-gray-scale-processed video signal S2, the first switching circuit 40 establishes the flag F1 to the pixel in which the motion detection result S4 indicates existence of motion, and outputs a video signal S6. S6 is then delayed by one field by the second delay circuit 60 to generate S8.

When the motion detection result S4 indicates no existence of motion, the first switching circuit 40 does not establish the flag F1 and outputs the video signal S6 which is later delayed by one field by the second delay circuit 60.

In detail, the first switching circuit 40 receives the output signal S4 in the direction for increasing the signal level from among the output signals S4 and S5 of the comparison circuit 20. It then switches and outputs the video signals S1, which are input according to existence states of the output signal S4 and the output signal S2 of the first gray scale number controlling/multiple gray scale processing circuit 30. In this instance, the first switching circuit 40 outputs the video signals S2. The light emission schemes of the video signals S2 are made consecutive by the first gray scale number controlling/multiple gray scale processing circuit 30 and output by the first switching circuit 40 when the pixels are determined to have motion by the comparison circuit 20. When the pixels are not determined to have motion, the first switching circuit 40 outputs the original video signal S1.

In this instance, the first switching circuit 40 adds a predetermined flag bit to a video signal bit which is originally needed for the output video signal S6 by using the flag F1. The decision circuit 50 at the rear of the comparison circuit 20 indicates that the first gray scale number controlling/multiple gray scale processing circuit 30 is selected through the flag F1. The first switching circuit 40 establishes the flag F1 to the pixels for the first selected gray scale number controlling/multiple gray scale processing circuit 30, and outputs result signals.

The decision circuit 50 receives the motion detection result S5 output by the comparison circuit 20 and the flag F1 added to the video signal S6, and outputs a switching decision result S7 of the lighted pattern to the second switching circuit 80.

In detail, the decision circuit 50 receives the output signal S5 in the direction for decreasing the signal level from among the output signals S4 and S5 of the comparison circuit 20 and the flag F1 from among the output signal S6 of the second delay circuit 60. The decision circuit 50 then either outputs the output signal S5 of the comparison circuit 20 to the second switching circuit 80 according to existence states of the flag F1 (i.e., outputs a switching decision result S7) or outputs no signal (i.e., outputs no switching decision result S7).

In further detail, when the motion detection result S5 indicates existence of motion, and the flag F1 is established, the decision circuit 50 outputs no signal to the second switching circuit 80. When the motion detection result S5 indicates no existence of motion and the flag F1 is established, the decision circuit 50 outputs no signal to the second switching circuit 80 in a like manner.

When the motion detection result S5 indicates existence of motion, and the flag F1 is not established, the decision circuit 50 outputs the output signal S5 of the comparison circuit 20 as the switching decision result S7 to the second switching circuit 80.

When the motion detection result S5 indicates no existence of motion and the flag F1 is not established, the decision circuit 50 outputs no signal to the second switching circuit 80.

When the flag F1 is established, the second delay circuit 60 delays the video signal S6 input by the first switching circuit 40 by one field while the flag F1 is added in a like manner of the first delay circuit 10, and outputs a video signal S8 (which is generated by delaying the video signal S6 by one field) to the decision circuit 50, the second gray scale number controlling/multiple gray scale processing circuit 70, and the second switching circuit 80.

The second gray scale number controlling/multiple gray scale processing circuit 70 corresponds to the first gray scale number controlling/multiple gray scale processing circuit 30, and it receives the video signal except the flag F1 from the video signal S8 output by the second delay circuit 60. The second gray scale number controlling/multiple gray scale processing circuit 70 then represents the video signal with the gray scales having consecutive light emission schemes, and generates the original gray scale number into multiple gray scales with consecutive gray scales. The second gray scale number controlling/multiple gray scale processing circuit 70 then outputs a video signal S9, which is generated by converting the video signal S8 into gray scales with consecutive light emission schemes.

The second switching circuit 80 receives the video signal S8 which is generated by delaying the video signal S6 output by the first switching circuit 40 by one field in the second delay circuit 60. The second switching circuit 80 also receives the converted video signal S9 and the switching decision results S7, if it exists. The switching circuit 80 then switches a lighted pattern according to existence states of the switching decision result S7 output through the decision circuit 50.

As described, since the decision circuit 50 outputs no signal S7 to the second switching circuit 80, when the motion detection result S5 indicates existence of motion and the flag F1 is established, the second switching circuit 80 outputs the video signal S8 input by the second delay circuit 60 to the PDP display (not illustrated) without switching the lighted pattern, in this situation.

In a like manner, since the decision circuit 50 outputs no signal to the second switching circuit 80 when the motion detection result S5 indicates no existence of motion and the flag F1 is established, the second switching circuit 80 outputs the video signal S8 (input by the second delay circuit 60) to the PDP display without switching the lighted pattern, in this situation.

The decision circuit 50 outputs the output signal S5 of the comparison circuit 20 as a switching decision result S7 to the second switching circuit 80 when the motion detection result S5 indicates existence of motion and the flag F1 is not established. Thus, the second switching circuit 80 switches the lighted pattern and outputs a video signal S9, which is input by the second gray scale number controlling/multiple gray scale processing circuit 70 to the PDP display.

The decision circuit 50 outputs no signal to the second switching circuit 80 when the motion detection result S5 indicates no existence of motion and the flag F1 is established. Thus, the second switching circuit 80 outputs the video signal S8 that is input by the second delay circuit 60 to the PDP display without switching the lighted pattern. In this instance, the second switching circuit 80 outputs the video signals S8 and S9 excluding the flag F1 after switching the lighted pattern.

In detail, the second switching circuit 80 receives the video signals, except the flag, from among the output signal S8 of the second delay circuit 60 and the output signal S9 of the second gray scale number controlling/multiple gray scale processing circuit 70, and the output signal S7 of the decision circuit 50. The second switching circuit 80 outputs the output signal S9 of the gray scale number controlling/multiple gray scale processing circuit 70 when the decision circuit 50 outputs the output signal S7, and outputs the output signal S8 of the second delay circuit 60 when the decision circuit 50 outputs no signal.

An operation of the video processing circuit 1 according to the exemplary embodiment of the present invention will be described.

The case in which a signal variation on the motion of the current field is greater than the previous field, as given as A in FIG. 13(*c*), will be described. The comparison circuit 20 receives the video signals S1 and S3 to compare the signal level of the video signal S1 with the signal level of the video signal S3, and outputs a motion detection result S4 to the first switching circuit 40 since the signal level of the video signal S1 is greater than the signal level of the video signal S3. Accordingly, the result of "existence of motion" is output to the first switching circuit 40 of the comparison circuit 20 in the portion A of FIG. 13(*c*).

The case in which a signal variation on the motion becomes lesser, as shown in B in FIG. 13(*c*), will now be described. The comparison circuit 20 receives the video signals S1 and S3 to compare the signal level of the video signal S1 with the signal level of the video signal S3, and outputs a motion detection result S5 to the decision circuit 50, since the signal level of the video signal S1 is less than the signal level of the video signal S3. Accordingly, the result of "existence of motion" is output by the decision circuit 50 of the comparison circuit 20 in the portion B of FIG. 13(*c*).

Figures 13, 14:
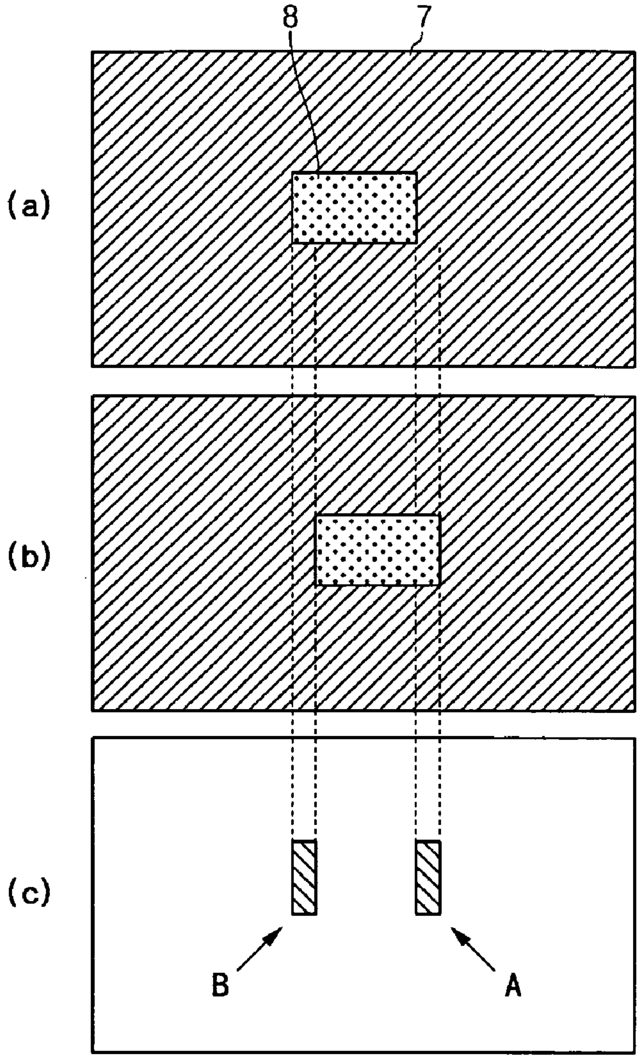
Fig. 13 (Prior Art)
Fig. 14 (Prior Art)
FIGS. 13(*a*), 13(*b*), and 13(*c*) show cases of the prior art combination of the gray scales 7 and 8 in the window of FIGS. 7 and 8.
FIG. 14 shows gray scales of previous positions of the areas A and B of FIG. 13(*c*) and the gray scales applied to the current fields in the prior art.

When the signal variation is increased as shown by the portion A of FIG. 13(*c*), the first switching circuit 40 receives the motion detection result S4 and selects the video signal S2 input by the first gray scale number controlling/multiple gray scale processing circuit 30. In this instance, the decision circuit 50 of the comparison circuit 20 outputs no motion detection result S5.

Also, when the first gray scale number controlling/multiple gray scale processing circuit 30 is selected, the video signal S6, to which the flag F1 is added, is output by the first switching circuit 40.

The video signal S6 output by the first switching circuit 40 is delayed by one field by the second delay circuit 60, and is output as a video signal S8 to the decision circuit 50, the second gray scale number controlling/multiple gray scale processing circuit 70, and the second switching circuit 80.

The decision circuit 50 receives the flag F1 added to the video signal S6, and outputs the switching decision result S7 of the lighted pattern to the second switching circuit 80. In this instance, the decision circuit 50 outputs no signal to the second switching circuit 80 (i.e., it does not output the switching decision result S7) when the flag F1 indicating a processed pixel is provided.

Therefore, the first gray scale number controlling/multiple gray scale processing circuit 30 outputs a once processed video signal to the PDP display through the second switching circuit 80.

Figure 2:
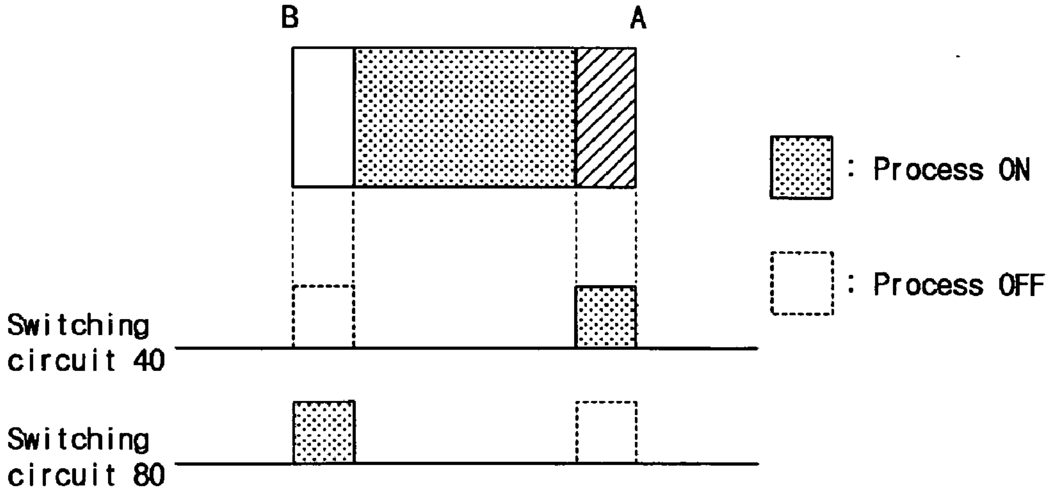
FIG. 2 shows a processing timing diagram of switching circuits 40 and 80, according to the embodiment of the video processing circuit shown in FIG. 1.

With reference to the timing chart of FIG. 2, the first switching circuit 40 establishes the processing by the first gray scale number controlling/multiple gray scale processing circuit 30 to be ON, establishes the flag F1, and outputs results as shown in the portion A of FIG. 2. Since the switching decision result S7 is not input when the flag F1 is provided in the decision circuit 50, the second switching circuit 80 establishes the processing by the second gray scale number controlling/multiple gray scale processing circuit 70 to be OFF, and outputs the video signal S8 to the PDP display.

Next, as shown by the portion B of FIG. 13(*b*), the case in which the signal variation is reduced will be described. The comparison circuit 20 receives the video signals S1 and S3 to compare the signal level of the video signal S1 with the signal level of the video signal S3, and outputs a motion detection result S5 to the decision circuit 50 since the signal level of the video signal S1 is less than the signal level of the video signal S3. Accordingly, the result of "existence of motion" is output by the decision circuit 50 of the comparison circuit 20.

Therefore, when the one-field-delayed output of the second delay circuit 60 has no flag, the second gray scale number controlling/multiple gray scale processing circuit 70 is selected, and the contour noise on the corresponding pixel is reduced.

That is, since the decision circuit 50 of the comparison circuit 20 outputs the motion detection result S5 and the first switching circuit 40 outputs no motion detection result S4, the first switching circuit 40 does not establish the flag F1, but selects the video signal S1.

The video signal S6 output by the first switching circuit 40 is delayed by one field by the second delay circuit 60, and is output as a video signal S8 to the decision circuit 50, the second gray scale number controlling/multiple gray scale processing circuit 70, and the second switching circuit 80.

The decision circuit 50 receives the motion detection result S5 from the comparison circuit 20, and outputs the switching decision result S7 of the lighted pattern to the second switching circuit 80.

For further description on this with reference to the timing chart of FIG. 2, the first switching circuit 40 establishes the processing by the first gray scale number controlling/multiple gray scale processing circuit 30 to be OFF, does not establish the flag F1, and outputs results in the portion B of FIG. 2. Since the switching decision result S7 is input when the flag F1 is not provided but the motion detection result S5 is provided in the decision circuit 50, the second switching circuit 80 establishes the processing by the second gray scale number controlling/multiple gray scale processing circuit 70 to be ON, and outputs the video signal S9 to the PDP display.

In other words, since the portion B of FIG. 13(*c*) is retroacted to the previous field and is then processed, the part of the gray scale 8 is represented by the gray scales 7 and 15 with consecutive light emission schemes.

As a result, the contour noise is reduced irrespective of big or small signal variation as described in the relations of the gray scales of the previous field and the current field of the portion A of FIG. 13(*c*).

Since the consecutive fields are processed in the actual video, it is also possible that the pixels, the signal variation of which has been determined to be changed from small to big, may be determined to be changed from big to small in the next field, and are then retroactively processed.

Figure 3:
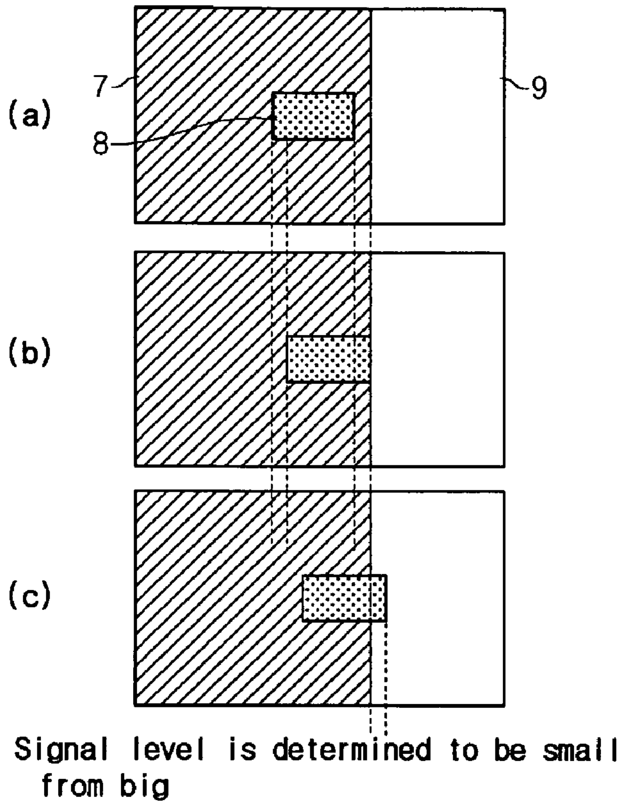
FIG. 3 shows an example of a screen on which dual multiple gray scale processing according to one embodiment of the invention can be performed.

FIGS. 3(*a*) to 3(*c*) show screen variation in a time series manner, and the time proceeds in the direction from (a) to (c). As shown in FIGS. 3(*a*) to 3(*c*), a window of the gray scale of 8/255 is moved on the background of the gray scale of 9/255. The signal level on the display screen is modified to 9 from 8 on the background of the gray scale of 7/255 and the background of the gray scale of 9/255. The signal level is determined to be varied from big to small, and if the decision circuit 50 does not exist, the process for reducing the contour noise is retroactive to the previous field and is performed.

It is unnecessary to further process the processed pixels since the light emission schemes are represented with consecutive gray scales, and it is not desirable in the viewpoint of gray scale characteristics. Therefore, the above-described flag addition process and the decision circuit 50 are provided to the video processing circuit 1 to thus prevent double processing. That is, as shown in the (b) field of FIG. 4, the signal level of the pixel portion to which the window is moved is determined to be modified from small to big, and the first switching circuit 40 receives the motion detection result S4, selects the video signal S2 input by the first gray scale number controlling/multiple gray scale processing circuit 30, adds the flag F1, and outputs the video signal S6.

The video signal S6 output by the first switching circuit 40 is delayed by one field by the second delay circuit 60, and is output as the video signal S8 to the decision circuit 50, the second gray scale number controlling/multiple gray scale processing circuit 70, and the second switching circuit 80.

The decision circuit 50 receives the flag F1 added to the video signal S6, and outputs the switching decision result S7 of the lighted pattern to the second switching circuit 80. In this instance, the decision circuit 50 outputs no signal to the second switching circuit 80 (i.e., does not output the switching decision result S7) when the flag F1 indicates the processed pixel is provided.

Figure 4:
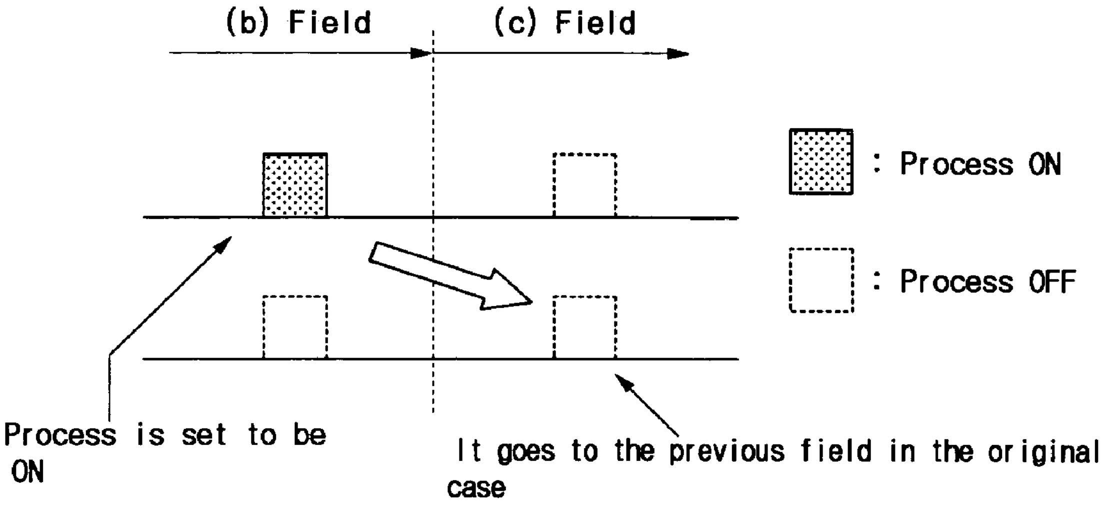
FIG. 4 shows a further processing timing diagram of switching circuits 40 and 80.
Figures 5, 6:
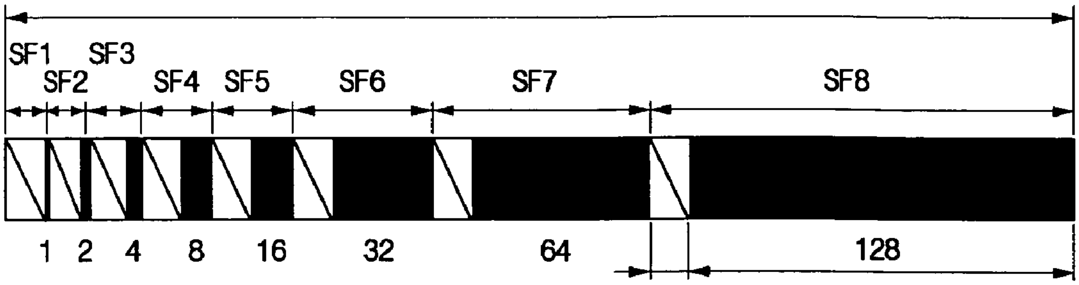
Fig. 5 (Prior Art)
Fig. 6 (Prior Art)
FIG. 5 shows a prior art subfield sequence for displaying 256 gray scales.
FIG. 6 shows prior art combinations of gray scales which are displayed when representing the 256 gray scales and the lighted subfields.
Figure 7:
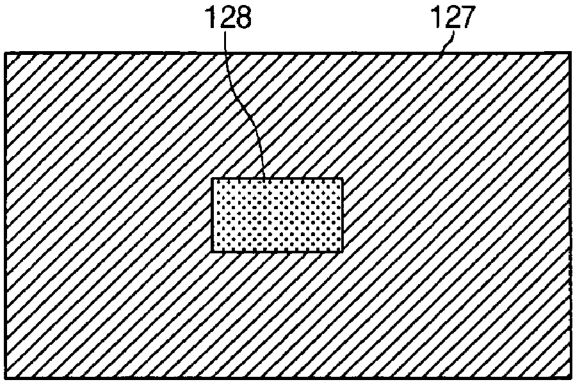
Fig. 7 (Prior Art)
FIG. 7 shows an example of a prior art screen on which the gray scales are represented by using a conventional subfield sequence.
Figure 8:
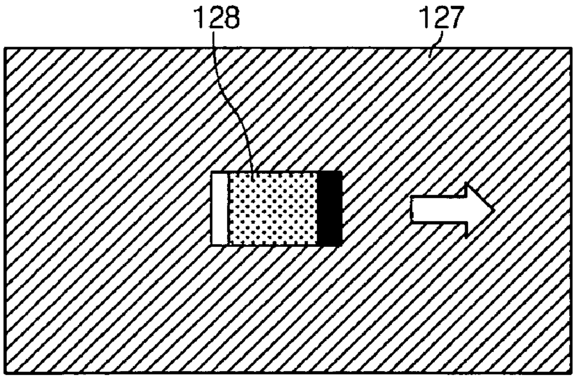
Fig. 8 (Prior Art)
FIG. 8 shows the window of the gray scale of 128/255 of FIG. 7 scrolled to the right on the screen.
Figure 9:
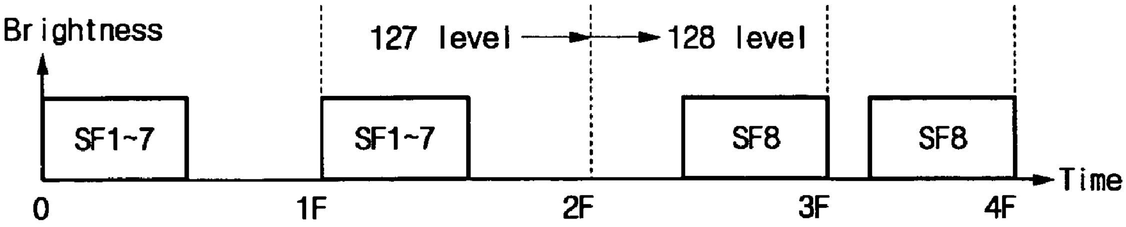
Fig. 9 (Prior Art)
FIG. 9 shows a prior art generation principle of the contour noise.
Figure 10:
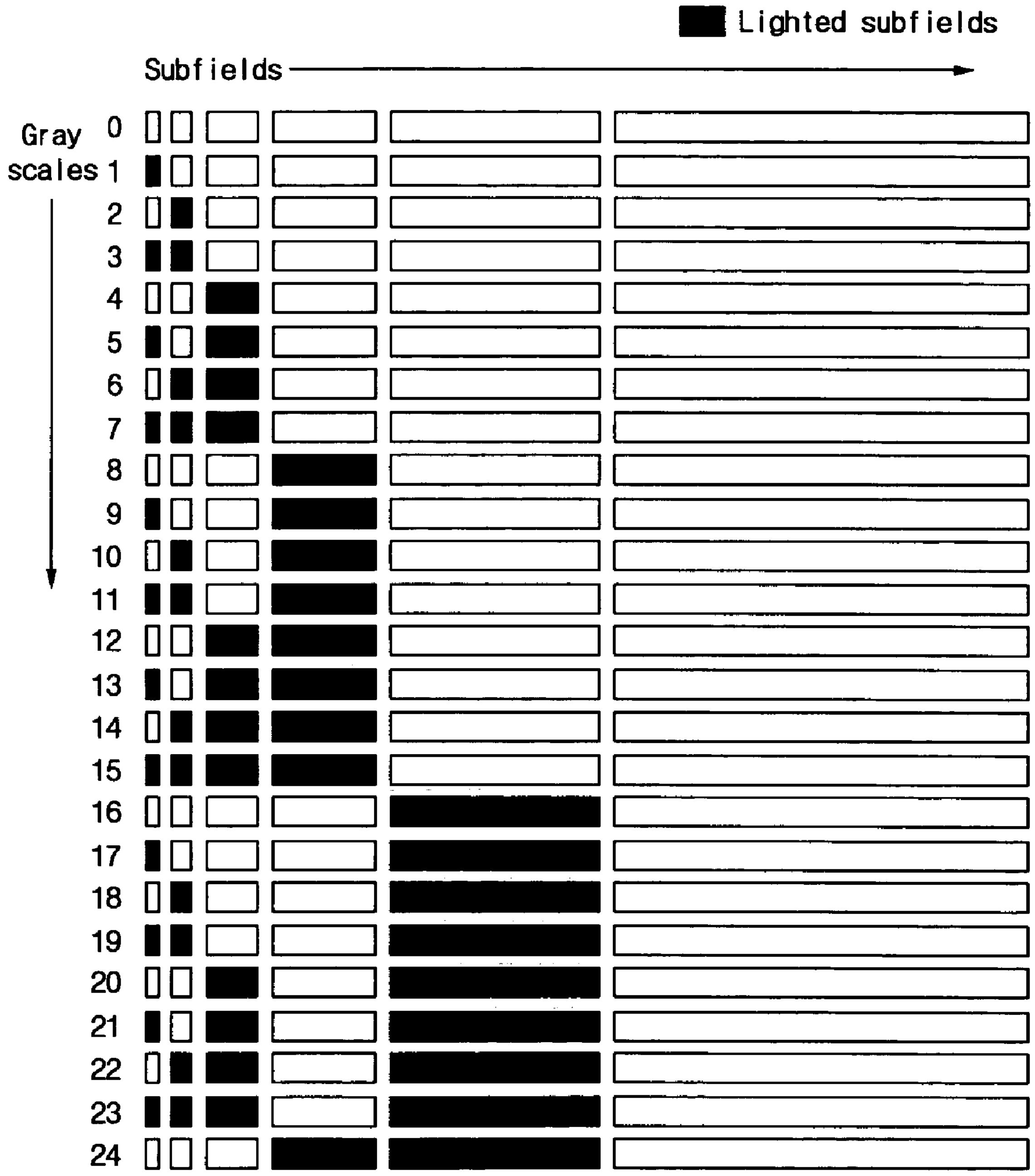
Fig. 10 (Prior Art)
FIG. 10 shows a prior art subfield arrangement diagram.

As shown in FIG. 4, the signal level of the pixel portion in which the window is moved on the background of the gray scale of 9/255 in the field (c) is determined to be modified to small from big, and the second switching circuit 80 retroactively goes to the previous field and performs a corresponding process when the flag F1 is not provided, but the video signal is processed once through the flag F1 in the video processing circuit 1 according to the exemplary embodiment, and no further process is performed thereon.

Accordingly, the once processed video signal is passed through the second switching circuit 80 to the PDP display in the first gray scale number controlling/multiple gray scale processing circuit 30.

Since the comparison circuit 20 and the decision circuit 50 perform detection on the near known area of the gray scales at which the contour noise is generated, in this embodiment, they do not process the unknown area, thereby preventing generation of a load caused by unnecessary processing.

As described, the video processing circuit 1 receives the video signal S1 and the one-field-delayed video signal S3, outputs the motion detection result S4 when the signal level of the video signal S1 is greater than the signal level of the video signal S3 and outputs the motion detection result S5 when the signal level of the video signal S1 is less than the signal level of the video signal S3. The circuit 1 then establishes the flag F1 according to the motion detection result S4, and outputs the video signal S8. The video signal S8 is generated by delaying the video signal S6 obtained by switching the lighted pattern, by one field. The circuit 1 then switches the lighted pattern of the video signal S8 according to the motion detection result S5 and the flag F1, thereby preventing the generation of the contour noise irrespective of varied directions of the light emission schemes.

As described, a first video signal and a second video signal delayed by a predetermined field are received, a first motion detection result is output when a signal level of the first video signal is greater than that of the second video signal, a second motion detection result is output when the signal level of the first video signal is less than that of the second video signal. The first video signal is received to switch a lighted pattern according to the first motion detection result. A predetermined flag signal is established to output a third video signal delayed by a predetermined field, and the third video signal is received to switch the lighted pattern according to the second motion detection result and the flag signal. Thus, the generation of contour noise irrespective of varied directions of the light emission schemes is prevented in this embodiment.

Although exemplary embodiments of the present invention have been described in detail hereinabove, it should be clearly understood that many variations and/or modifications of the basic inventive concept taught herein, which may appear to those skilled in the art, will still fall within the spirit and scope of the present invention, as defined in the appended claims.

What is claimed is:

1. A plasma display panel video processing circuit comprising:

- a comparison circuit for receiving a first video signal and a second video signal which is delayed by a predetermined field, outputting a first motion detection result when a signal level of the first video signal is greater than a signal level of the second video signal, and outputting a second motion detection result when the signal level of the first video signal is less than the signal level of the second video signal;
- a first switching circuit for receiving the first video signal, switching a lighted pattern according to the first motion detection result output by the comparison circuit, establishing a predetermined flag signal, and outputting a third video signal which is delayed by the predetermined field; and
- a second switching circuit for receiving the third video signal output by the first switching circuit, and switching the lighted pattern according to the second motion detection result output by the comparison circuit and the flag signal of the third video signal.

2. The circuit of claim 1, wherein the comparison circuit compares the signal level of the first video signal with the signal level of the second video signal as a near value at which contour noise can be generated.

3. The circuit of claim 1, wherein the first switching circuit converts the first video signal into a gray scale with consecutive light emission schemes to thus generate the converted video signal into multiple gray scales, establishes the flag signal, and outputs the third video signal delayed by the predetermined field, when the first motion detection result indicates existence of motion.

4. The circuit of claim 1, wherein the first switching circuit performs gray scale conversion and multiple gray scale processing on a pixel which indicates that the first motion detection result has existence of motion.

5. The circuit of claim 1, wherein the first switching circuit outputs the third video signal which is generated by delaying the first video signal by the predetermined field without establishing the flag signal when the first motion detection result indicates no existence of motion.

6. The circuit of claim 1, wherein the second switching circuit outputs the third video signal without switching the lighted pattern when the second motion detection result indicates existence of motion and the flag signal is established.

7. The circuit of claim 1, wherein the second switching circuit outputs the third video signal without switching the lighted pattern when the second motion detection result indicates no existence of motion and the flag signal is established.

8. The circuit of claim 1, wherein the second switching circuit switches the lighted pattern and outputs the third video signal when the second motion detection result indicates existence of motion and the flag signal is not established.

9. The circuit of claim 1, wherein the second switching circuit outputs the third video signal without switching the lighted pattern when the second motion detection result indicates no existence of motion and the flag signal is not established.

10. The circuit of claim 1, wherein the second switching circuit outputs the third video signal except the flag signal after switching the lighted pattern.

11. The circuit of claim 1, wherein the predetermined field is one field.

12. A plasma display panel video processing method comprising:

receiving a first video signal and a second video signal which is delayed by a predetermined field, outputting a first motion detection result when a signal level of the first video signal is greater than a signal level of the second video signal, and outputting a second motion detection result when the signal level of the first video signal is less than the signal level of the second video signal;

receiving the first video signal, switching a lighted pattern according to the first motion detection result, establishing a predetermined flag signal, and outputting a third video signal which is delayed by the predetermined field; and receiving the third video signal, and switching the lighted pattern according to the second motion detection result and the flag signal.

13. The method of claim 12, further comprising comparing the signal level of the first video signal with the signal level of the second video signal for a near value at which contour noise can be generated.

14. The method of claim 12, wherein when the first motion detection result indicates existence of motion, the method further comprising:

converting the first video signal into a gray scale with consecutive light emission schemes to generate the converted video signal into multiple gray scales;

establishing the flag signal; and outputting the third video signal delayed by the predetermined field.

15. The method of claim 12, further comprising gray scale converting and multiple gray scale processing of a pixel which indicates that the first motion detection result has existence of motion.

16. The method of claim 12, wherein the third video signal which is generated by delaying the first video signal by the predetermined field is output without establishing the flag signal when the first motion detection result indicates no existence of motion.

17. The method of claim 12, wherein the third video signal is output without switching the lighted pattern when the second motion detection result indicates existence of motion and the flag signal is established.

18. The method of claim 12, wherein the third video signal is output without switching the lighted pattern when the second motion detection result indicates no existence of motion and the flag signal is established.

19. The method of claim 12, wherein the lighted pattern is switched and the third video signal is output when the second motion detection result indicates existence of motion and the flag signal is not established.

20. The method of claim 12, wherein the third video signal is output without switching the lighted pattern when the second motion detection result indicates no existence of motion and the flag signal is not established.

21. The method of claim 12, wherein the third video signal is output except the flag signal after switching the lighted pattern.

22. The method of claim 12, wherein the predetermined field is one field.

23. A video display device using a plasma display panel comprising:

a comparison circuit for receiving a first video signal and a second video signal which is delayed by a predetermined field, outputting a first motion detection result when a signal level of the first video signal is greater than a signal level of the second video signal, and outputting a second motion detection result when the signal level of the first video signal is less than the signal level of the second video signal;

a first switching circuit for receiving the first video signal, switching a lighted pattern according to the first motion detection result output by the comparison circuit, establishing a predetermined flag signal, and outputting a third video signal which is delayed by the predetermined field;

a second switching circuit for receiving the third video signal output by the first switching circuit, and switching the lighted pattern according to the second motion detection result output by the comparison circuit and the flag signal of the third video signal; and a display for displaying the video according to the video signal output by the second switching circuit.

24. A video display method using a plasma display panel comprising:

receiving a first video signal and a second video signal which is delayed by a predetermined field, outputting a first motion detection result when a signal level of the first video signal is greater than a signal level of the second video signal, and outputting a second motion detection result when the signal level of the first video signal is less than the signal level of the second video signal;

receiving the first video signal, switching a lighted pattern according to the first motion detection result, establishing a predetermined flag signal, and outputting a third video signal which is delayed by the predetermined field;

receiving the third video signal, and switching the lighted pattern according to the second motion detection result and the flag signal; and displaying the third video signal.

* * * * *